(12) United States Patent
Cellier et al.

(10) Patent No.: US 10,301,941 B2
(45) Date of Patent: May 28, 2019

(54) TURBINE ENGINE ROTOR BLADE

(71) Applicant: SNECMA, Paris (FR)

(72) Inventors: Damien Joseph Cellier, Paris (FR); Alicia Lise Julia Dufresne, Paris (FR); Philippe Pierre Marcel Marie Pelletrau, Vaux-le-Penil (FR); Vincent Paul Gabriel Perrot, Maisons Alfort (FR); Laurent Christophe Francis Villaines, Vaux le Penil (FR)

(73) Assignee: SAFRAN AIRCARFT ENGINES, Paris (FR)

( * ) Notice: Subject to any disclaimer, the term of this patent is extended or adjusted under 35 U.S.C. 154(b) by 408 days.

(21) Appl. No.: 14/910,586

(22) PCT Filed: Aug. 4, 2014

(86) PCT No.: PCT/FR2014/052023
§ 371 (c)(1),
(2) Date: Feb. 5, 2016

(87) PCT Pub. No.: WO2015/019009
PCT Pub. Date: Feb. 12, 2015

(65) Prior Publication Data
US 2016/0195104 A1 Jul. 7, 2016

(30) Foreign Application Priority Data

Aug. 7, 2013 (FR) ...................................... 13 57855

(51) Int. Cl.
*F01D 5/14* (2006.01)
*F04D 29/32* (2006.01)
*F04D 29/38* (2006.01)

(52) U.S. Cl.
CPC ........... *F01D 5/141* (2013.01); *F04D 29/324* (2013.01); *F04D 29/384* (2013.01); *F05D 2240/303* (2013.01); *Y02T 50/673* (2013.01)

(58) Field of Classification Search
None
See application file for complete search history.

(56) References Cited

U.S. PATENT DOCUMENTS 8,147,207 B2 * 4/2012 Orosa ................... F04D 29/324
415/182.1
2005/0031454 A1 2/2005 Doloresco et al.
(Continued)

FOREIGN PATENT DOCUMENTS

CA 2 822 786 A1 7/2012
EP 1 505 302 A1 2/2005
(Continued)

OTHER PUBLICATIONS

International Search Report dated Feb. 9, 2015 in PCT/FR14/52023 Filed Aug. 4, 2014.
(Continued)

*Primary Examiner* — Justin D Seabe
*Assistant Examiner* — Juan G Flores
(74) *Attorney, Agent, or Firm* — Oblon, McClelland, Maier & Neustadt, L.L.P.

(57) ABSTRACT

A turbine engine rotor blade including an airfoil defined by plane airfoil sections stacked in a radial direction, each airfoil section being positioned radially at a height H, where height H is expressed as a percentage of the total height of the airfoil, and being identified by its sweep angle λ and its dihedral angle ν, wherein the sweep angle λ varies as a function of height H in such a manner that the sweep angle λ reaches a maximum at a height HλM, the value HλM lying in the range 5% to 40%, and the sweep angle λ increases (Continued)

from 0% to HλM, and wherein the dihedral angle ν varies as a function of H, the dihedral angle ν being a decreasing function of height H for heights H lying in the range 0% to Hν1, Hν1 lying in the range 10% to 40%.

17 Claims, 3 Drawing Sheets

(56) References Cited

U.S. PATENT DOCUMENTS

| | | | |
|---|---|---|---|
| 2010/0054946 A1* | 3/2010 | Orosa | F04D 29/324 416/223 R |
| 2012/0244005 A1 | 9/2012 | Breeze-Stringfellow et al. | |
| 2013/0323065 A1 | 12/2013 | Murooka | |
| 2014/0341749 A1 | 11/2014 | Perrot et al. | |

FOREIGN PATENT DOCUMENTS

| | | |
|---|---|---|
| FR | 2 983 234 A1 | 5/2013 |
| SU | 521401 A1 | 7/1976 |
| WO | 2009/103528 A2 | 8/2009 |

OTHER PUBLICATIONS

Russian Search Report dated May 10, 2018 in Patent Application No. 2016107872 (with English translation of categories of cited documents), citing documents AA and AO therein, 3 pages.

* cited by examiner

TURBINE ENGINE ROTOR BLADE

FIELD OF THE INVENTION

The present description relates to a turbine engine rotor blade, and more particularly to a blade for the compressor of an aviation turbine engine such as an airplane turbojet.

STATE OF THE PRIOR ART

Airplane turbojets conventionally comprise, from upstream to downstream in the gas flow direction: a fan; one or more compressor stages, e.g. a low pressure compressor and a high pressure compressor; a combustion chamber; one or more turbine stages, e.g. a high pressure turbine and a low pressure turbine; and a gas exhaust nozzle. The or each compressor comprises one or more stages of rotor blades moving past one or more stages of stator vanes (known as guide vanes). The rotor blades are arranged regularly at the periphery of a disk that is driven by the rotor of the turbine engine. The rotor blades are fastened to the rotor via their roots, and each comprises an airfoil extending radially from its root to the free end (or tip) of the blade.

In the present description, the term "axial direction" designates the direction corresponding to the axis of rotation of the rotor of the turbine engine. The term "axis of the turbine engine" designates this axis of rotation. A radial direction is a direction perpendicular to the axis of the turbine engine and intersecting said axis. This direction corresponds to radii of the rotor. Finally, the term "tangential direction" is used to designate the direction perpendicular to the axis of the turbine engine and to a radial direction, and not intersecting the axis of the turbine engine.

A blade airfoil can be defined as a series of plane profiles or airfoil sections that are stacked on one another along a line known as the stacking line, starting from the proximal end of the airfoil (connected to the blade root) and going to the distal end of the airfoil (corresponding to the tip of the blade) and interconnecting the centers of gravity of the airfoil sections. The shape of the blade may be defined by variations in the airfoil profiles between the low (or proximal) portion and the high (or distal) portion of the airfoil, by the twist applied to each airfoil section as a function of its position along the height of the airfoil, and by the shape given to the stacking line.

When a blade airfoil is defined in this way, each airfoil section is positioned radially at a certain height. The height axis is oriented going away from the center such that height increases on going from the low or proximal portion towards the high or distal portion of the airfoil. The plane of each airfoil section is thus at a certain radial height. Furthermore, the position of each airfoil section may be located by its sweep angle and its dihedral angle. These angles measure the differences in direction between the flow and the airfoil section, as projected respectively onto a radial and axial plane and onto a plane that is axial and tangential to the direction of rotation of the engine. Using the notation shown in FIGS. 1 and 2, these angles may be expressed by the following equations, where $\lambda$ designates the sweep angle, $\nu$ designates the dihedral angle, $\tan \beta = Vu/Va$, and $\tan \varphi = Vr/Va$, Vr, Vu, and Va are the components in the radial, tangential, and axial directions of the flow:

$$\sin \lambda = \frac{\tan \varphi + \tan \mu + \tan \eta \tan \beta}{\sqrt{(1 + \tan^2 \eta + \tan^2 \mu)(1 + \tan^2 \beta + \tan^2 \varphi)}}$$

$$\sin \nu = \frac{\sec \varphi \tan \eta - \tan \beta (\sin \varphi + \cos \varphi \tan \mu)}{\sqrt{(1 - \tan \varphi \tan \mu)^2 + (\tan \beta - \tan \varphi \tan \eta)^2 + (\tan \eta - \tan \beta \tan \mu)^2}}$$

If the flow is purely axial, which is more or less true upstream from the blade, the sweep angle expresses the angle of inclination of the blade in the axial direction, and the dihedral angle expresses the angle of inclination of the blade in the tangential direction. A negative sign for the sweep angle expresses an upstream angle of inclination and a positive sign a downstream angle of inclination; a negative sign for the dihedral angle expresses an angle of inclination towards the pressure side, and a positive sign expresses an angle of inclination towards the suction side. The angles of inclination are defined from outward radial directions.

The design of a turbine engine blade, and more particularly of a compressor blade, needs to satisfy various multidisciplinary criteria. The airfoil of the blade needs to be optimized in terms of efficiency while having good mechanical strength, in particular at high speeds of rotation for which the mechanical stresses to which the blade is subjected are the most severe. The design of a compressor blade must also comply with surge margin criteria.

SUMMARY OF THE INVENTION

The present description provides a turbine engine rotor blade, and more particularly a turbine engine compressor blade, the blade comprising an airfoil defined by plane airfoil sections stacked in a radial direction, each airfoil section being positioned radially at a height H, where height H is expressed as a percentage of the total height of the airfoil, and being located by its sweep angle $\lambda$, and its dihedral angle $\nu$. The sweep angle $\lambda$, varies as a function of height H in such a manner that the sweep angle $\lambda$ reaches a maximum at a height H$\lambda$M, the value H$\lambda$M lying in the range 5% to 40%, and that the sweep angle $\lambda$ increases from 0% to H$\lambda$M. The dihedral angle $\nu$ varies as a function of H in such a manner that the dihedral angle $\nu$ is a decreasing function of height H for heights H lying in the range 0% to a value H$\nu$1, the value H$\nu$1 lying in the range 10% to 40%.

The above relationships for variation of the sweep angle $\lambda$ and of the dihedral angle $\nu$ define a particular shape for the stacking line of the airfoil in the low (or proximal) portion of the airfoil. This particular shape makes it possible to improve the aeromechanical behavior of the airfoil, i.e. to increase the efficiency of the airfoil on the operating line while significantly reducing dynamic stresses in the low portion of the airfoil. Furthermore, the surge margin is degraded by little or not at all by this airfoil shape.

Unless specified to the contrary, in the present description, the adjectives top, bottom, positive, negative, increasing, decreasing, convex, and concave are used strictly, such that an increasing (or decreasing) function is not constant and a convex (or concave) function is not linear.

In certain embodiments, each airfoil section has a chord C defined in the airfoil section plane. The variation in the chord C as a function of height H is such that the chord C is a continuous and increasing function of height H; the chord C is a convex function of height H for heights H lying between the values HC1 and HC2, the value HC1 lying in the range 0% to 30%, and the value HC2 lying in the range 40% to 70%; and the straight line connecting the point of abscissa value HC1 and ordinate value C(HC1) to the point of abscissa value HC2 and ordinate value C(HC2) has a slope lying in the range 0.85 to 3.70.

In certain embodiments, the straight line connecting the point of abscissa value HC1 and ordinate value C(HC1) to the point of abscissa value HC21 and ordinate value C(HC21) has a slope lying in the range 1.20 to 11.40, the abscissa value HC21 being equal to the abscissa value HC1 plus 20%.

At a given height, the chord of an airfoil is the straight line segment interconnecting the leading edge and the trailing edge of the airfoil. In the present description, the height of the airfoil is expressed as a percentage of the total height of the airfoil, and the chord value is expressed as a percentage of the mean chord over the full height of the airfoil. The slopes of the above-specified lines are thus expressed without units. The particular relationships for variation of the chord in the low portion of the airfoil, as defined above, serves to further improve the efficiency and to further reduce the dynamic stresses in the low portion of the airfoil.

In certain embodiments, the variation in sweep angle $\lambda$, as a function of H is such that the sweep angle $\lambda$, is positive for heights H lying in the range of values H$\lambda$1 to H$\lambda$2, the values H1$\lambda$ and H$\lambda$2 lying in the range 0% to 50%, and the sweep angle $\lambda$, is negative in the range 0% to H$\lambda$1 and/or in the range H$\lambda$2 to 100%.

In certain embodiments, the value of the dihedral angle $\nu$ varies as a function of H in such a manner that the dihedral angle $\nu$ increases for heights in the range Hv1 to Hv1+20%.

In certain embodiments, the dihedral angle $\nu$ varies as a function of H in such a manner that the dihedral angle $\nu$ reaches a minimum that is negative for a height Hvm, the value Hvm lying in the range 10% to 40%.

These particular relationships for variation of the sweep and dihedral angles in the lower portion of the airfoil serve to further improve efficiency and further reduce dynamic stresses in the low portion of the airfoil.

The present description also relates to a turbine engine compressor including a plurality of blades as described above.

The present description also relates to a turbine engine including a plurality of blades as described above.

The above characteristics and advantages, and others, appear on reading the following detailed description of embodiments of the proposed blade. This detailed description refers to the accompanying drawings.

BRIEF DESCRIPTION OF THE DRAWINGS

The accompanying drawings are diagrammatic and are not necessarily to scale, and they seek above all to illustrate the principles of the invention.

DETAILED DESCRIPTION OF THE INVENTION

Embodiments of the proposed turbine engine blade are described in detail below, with reference to the accompanying drawings. These embodiments show the characteristics and the advantages of the invention. It should nevertheless be recalled that the invention is not limited to these embodiments.

Figure 1:
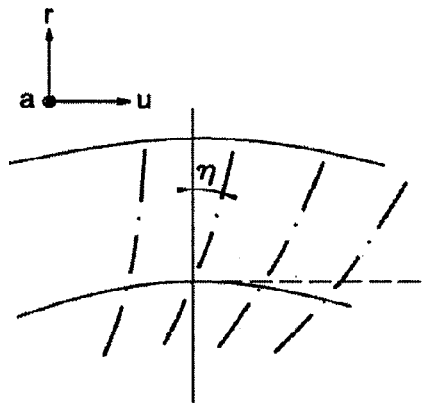
FIG. 1 is a fragmentary and diagrammatic cross-section view of a turbine engine compressor.
Figure 2:
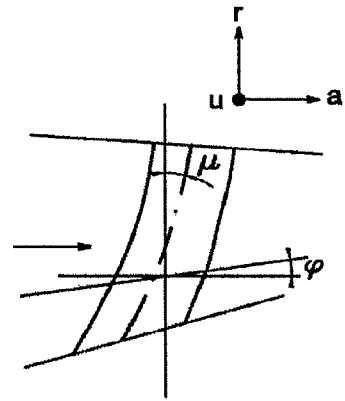
FIG. 2 is a fragmentary and diagrammatic longitudinal section view of a turbine engine compressor.

FIGS. 1 and 2 are well known to the person skilled in the art and they serve to define the angles $\eta$, $\mu$, and $\varphi$ of an airfoil relative to a fluid flowing in the direction a. The angles $\eta$, $\mu$, and $\varphi$ are used for calculating the sweep angle $\lambda$, and the dihedral angle $\nu$ using the formulas given above.

Figure 3:
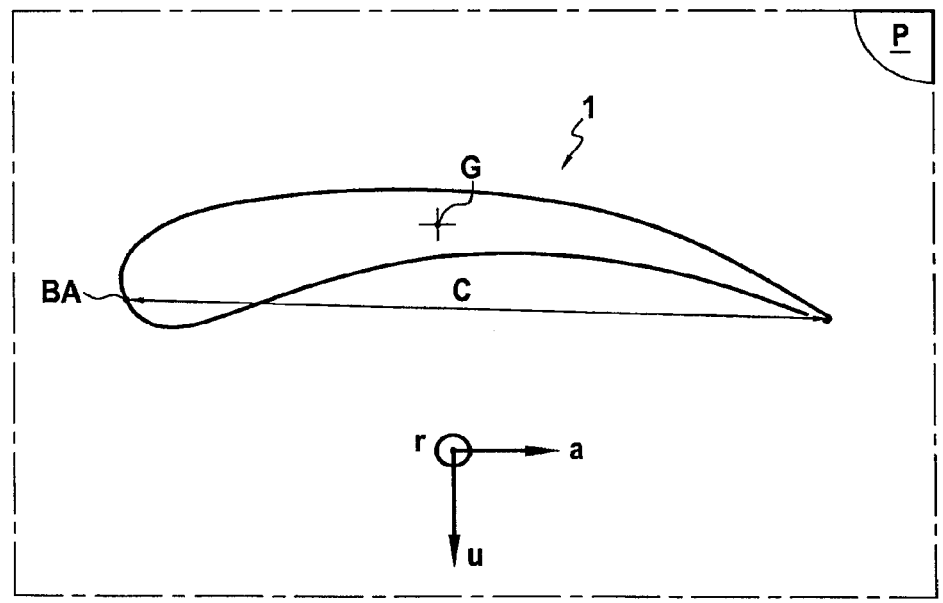
FIG. 3 shows an example of an individual blade section.

FIG. 3 shows an example of an airfoil section 1 of a blade. An airfoil section of a blade is a plane section situated in a plane P that is perpendicular to the radial axis of the blade. The plane P of an airfoil section 1 is thus situated at a certain radial height H measured in the radial direction $\underline{r}$. The plane P may thus be provided with an orthogonal Cartesian reference frame (O, $\underline{a}$, $\underline{u}$) where the abscissa axis $\underline{a}$ is an axis parallel to the axial direction, being oriented in the normal direction the gas flow, and where the ordinate axis u is a tangential axis, being oriented from the pressure side towards the suction side of the airfoil. The origin of the selected reference frame is taken so that all of the origins of the airfoil sections lie on the same orthogonal projection onto the plane of equation H=0, i.e. onto the plane perpendicular to the radial direction $\underline{r}$ of the airfoil and of height H set at 0%. It should be observed that the height H is expressed as a percentage of the total height of the airfoil, and that since the height axis extends from the low or proximal portion of the airfoil to the high or distal portion of the airfoil, the height H=0 corresponds to the proximal end of the airfoil.

In the Cartesian reference frame (O, $\underline{a}$, $\underline{u}$), the center of gravity G of the airfoil section has an abscissa value (or axial position) Xg and an ordinate value (or tangential position) Yg. In the present description, the relationships for stacking airfoil sections are given as a function of the sweep angle $\lambda$, and as a function of the dihedral angle $\nu$ at the leading edge of the airfoil.

The chord is the straight line segment in the airfoil section plane connecting the leading edge BA to the trailing edge of the airfoil. The term "chord" C thus designates interchangeably this segment and the length of this segment.

Figure 4:
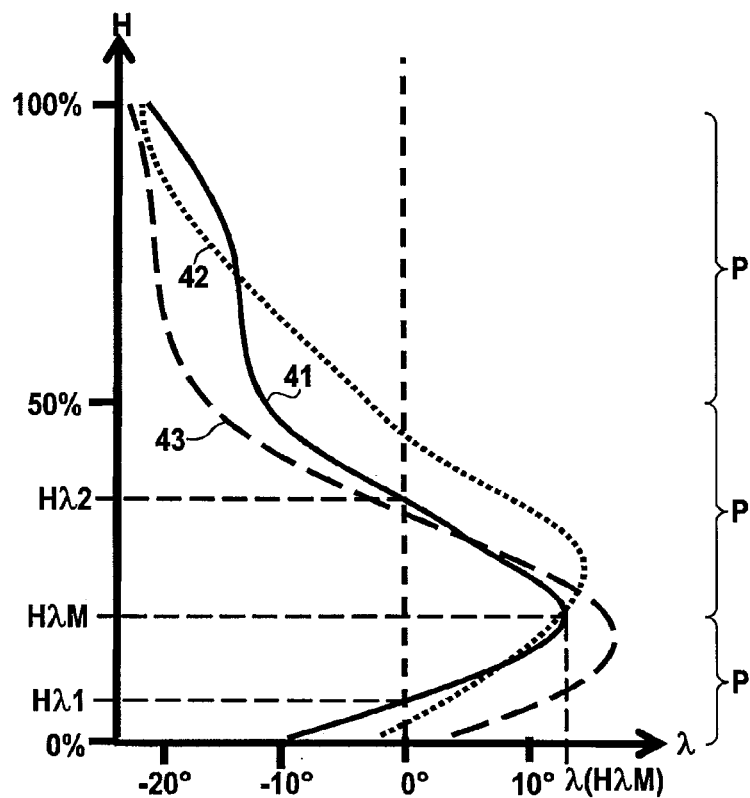
FIG. 4 shows examples of relationships for variation in the sweep angle $\lambda$ as a function of height H.
Figure 5:
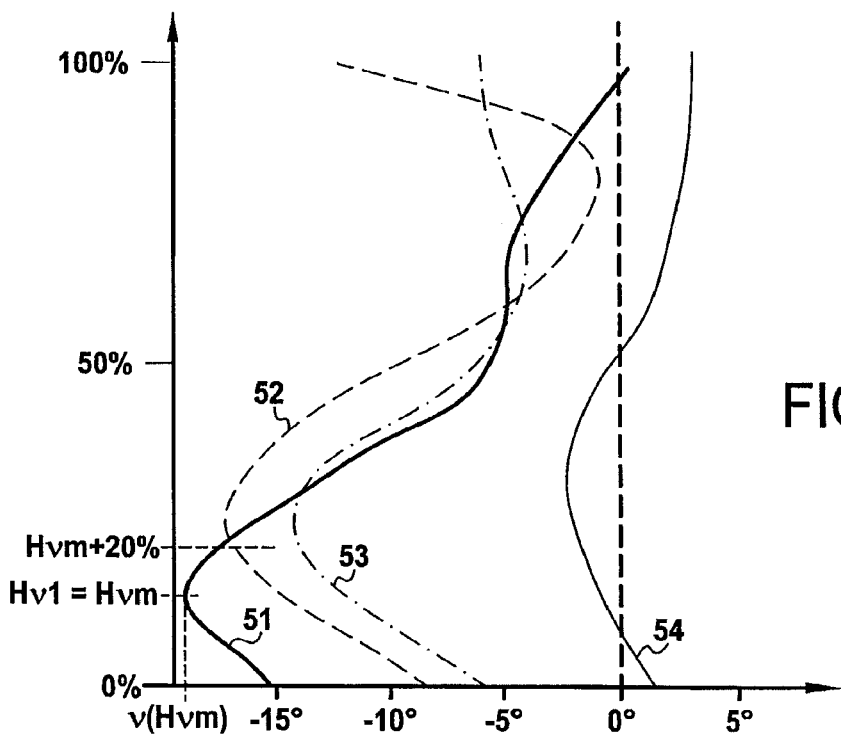
FIG. 5 shows examples of relationships for variation in the dihedral angle $\nu$ as a function of height H.
Figure 6:
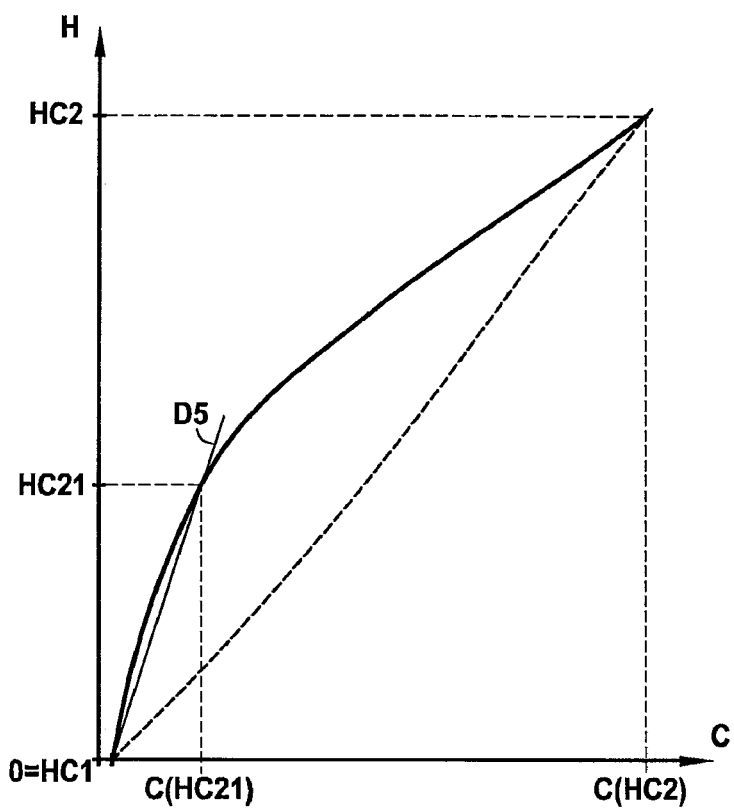
FIG. 6 shows a first element of a chord relationship C as a function of height H.
Figure 7:
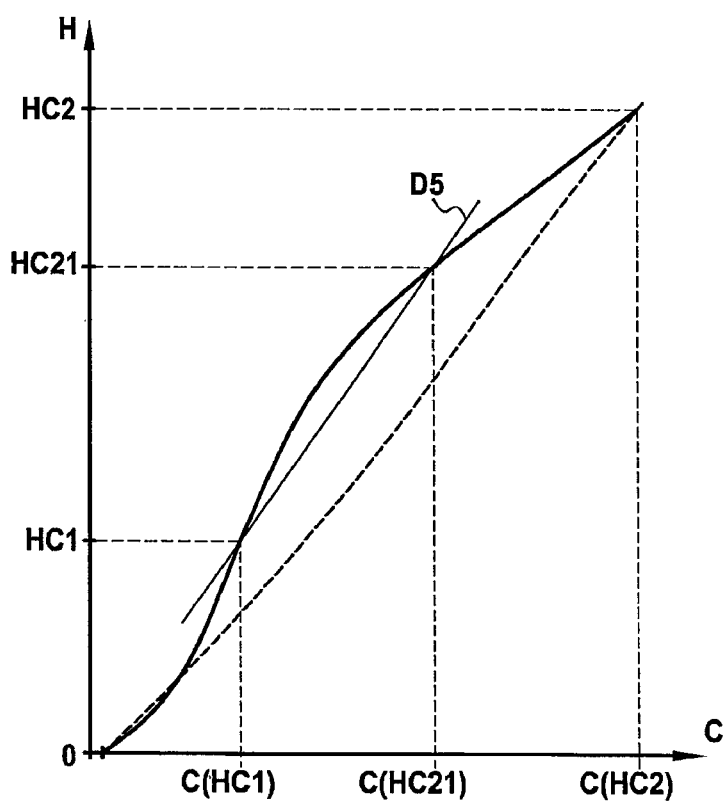
FIG. 7 shows a second example of a chord relationship C as a function of height H.

FIGS. 4 to 7 show examples of relationships for stacking airfoil sections. FIG. 4 shows examples of relationships for variation in the sweep angle $\lambda$ as a function of height H. FIG. 5 shows examples of relationships for variation in the dihedral angle $\nu$ as a function of height H. FIGS. 6 and 7 show examples of relationships for variation in the chord C as a function of height H.

FIG. 4 shows three examples 41, 42, and 43 of relationships for variation in the sweep angle $\lambda$ as a function of height H, for heights lying in the range 0% to 100% of the height of the airfoil. At a height H$\lambda$M lying in the range 5% to 40%, the sweep angle $\lambda$ reaches a maximum $\lambda$(H$\lambda$M). The maximum $\lambda$(H$\lambda$M) is preferably positive. Thus, the sweep angle may be positive over a range between bounds H$\lambda$1 and H$\lambda$2 and includes the value H$\lambda$M. The values H$\lambda$1 and H$\lambda$2 may lie in the range 0% to 50%. The values H$\lambda$1 and H$\lambda$2 preferably form a range of amplitudes that is greater than or equal to 10% of the height of the airfoil. In FIG. 4, the values H$\lambda$M, $\lambda$(H$\lambda$M), H$\lambda$1, and H$\lambda$2 are marked with reference to the curve representing the relationship 41 for variation in the sweep angle $\lambda$.

Advantageously, the sweep angle increases for heights lying in the range 0% to H$\lambda$M. As shown in FIG. 4, the sweep angle at the proximal end of the airfoil (i.e. at the height 0%) may be positive or negative. If it is positive, the value H$\lambda$1 may, by way of example, be 0% and the sweep angle λ may, by way of example, be substantially 5° at the proximal end of the airfoil. If it is negative, then the sweep angle λ may be negative for heights lying in the range 0% and the height Hλ1. By way of example, the sweep angle λ at the proximal end of the airfoil may be substantially −10°. Independently, the sweep angle λ may be negative for heights lying in the range Hλ2 to 100%. The sweep angle λ may decrease, at least for heights lying in the range 90% to 100%, or between Hλ2 and 100%, or indeed HλM and 100%.

In the example variation relationship 41 of FIG. 4, insofar as the sweep angle λ is continuous, negative at the ends of the airfoil, and reaches a maximum that is positive, the curve representing the sweep angle λ crosses the axis λ=0° at two points. In FIG. 4, these points have respective abscissa values Hλ1 and Hλ2.

The variation in the sweep angle λ may be subdivided into three stages, which are shown in FIG. 4 with reference to the variation relationship 41, but which can be generalized to the other variation relationships of the sweep angle λ. During a first stage P1, from 0% to HλM, the sweep angle λ increases from a possibly negative value up to its maximum, which is positive. In the second stage P2, from HλM to about Hλ2+10%, the sweep angle λ decreases and becomes negative again, until it reaches a value substantially equal to its value at the proximal end of the airfoil (at H=0%). In a third stage P3, from Hλ2+10% to 100%, the sweep angle λ also decreases, but less steeply than in the second stage. The sweep angle reaches its minimum at the distal end of the airfoil, i.e. for H=100%.

Each of the variation relationships 41, 42, and 43 is described in detail below with reference to the examples of FIG. 4. In the variation relationship 41, the sweep angle λ is negative at the proximal end of the airfoil and may be substantially −10°. Thereafter it increases up to a height HλM, which may be substantially 20%, where it reaches its maximum of substantially 12°. Thereafter it decreases, crossing through 0° at a height Hλ2, which may be substantially 39%. From about 50%, the sweep angle λ in the variation relationship 41 decreases more slowly, and then decreases once more steeply from a height, which may be substantially 78%.

In the variation relationship 42, the sweep angle λ is slightly negative at the proximal end of the airfoil, where it may be substantially −2°. Thereafter it increases up to a height HλM, which may be substantially 28%, where it reaches its maximum of substantially 16°. Thereafter it decreases, crossing 0° at a height Hλ2, which may be substantially 48%. At this point, there is a small change in slope, but the sweep angle λ continues to decrease steeply. Nevertheless, as from about 90%, the sweep angle λ in the variation relationship 42 decreases more slowly.

In the variation relationship 43, the sweep angle λ is positive at the proximal end of the airfoil where it may be substantially 3°. Thereafter, it increases up to a height HλM, which may be substantially 18%, where it reaches its maximum of substantially 17°. Thereafter it decreases, crossing 0° at a height Hλ2, which may be substantially 35%. From about 50%, the sweep angle λ in the variation relationship 43 decreases more slowly and it conserves this slow rate of decrease until it reaches its minimum at the distal end of the airfoil.

FIG. 5 shows four examples 51, 52, 53, and 54 of variation relationships of the dihedral angle ν as a function of height H, for heights lying in the range 0% to 100% of the height of the airfoil. The dihedral angle decreases from 0% to a height Hv1 lying in the range 10% to 40%. At the height Hvm lying from Hv1 to 40%, the dihedral angle reaches a minimum ν(Hvm). The minimum ν(Hvm) is preferably negative. As shown in FIG. 5, the values Hv1 and Hvm may possibly coincide. The dihedral angle ν may also be negative at the proximal end of the airfoil, i.e. at a height H=0%. Furthermore, in the examples shown in FIG. 5, the dihedral angle increases from Hvm to Hvm+20%. As from Hvm+20%, and until 100%, the dihedral angle ν may follow a conventional relationship, known to the person skilled in the art. A plurality of different complementary relationships are drawn in FIG. 5 for heights lying in the range 60% to 100%.

The variation relationships 51, 52, and 53 of FIG. 5 have in common the fact that the dihedral angle ν decreases from 0% to the value Hvm, where the value Hvm lies in the range 10% to 25% depending on the relationship under consideration. At the proximal end of the airfoil (H=0%), the dihedral angle ν may lie in the range −20° to −5° depending on the relationship under consideration. The minimum ν(Hvm) reached at a height Hvm may lie in the range −25° to −10° depending on the relationship under consideration. The relationships 51, 52, and 53 also have in common the fact that the dihedral angle ν increases from the value Hvm to about 50%, and that it is negative for heights lying in the range 0% to about 50%.

The variation relationships 51, 52, and 53 differ considerably for airfoil heights of more than about 50%. In the variation relationship 51 drawn as a bold continuous line, the dihedral angle ν is substantially constant from about 50% over a range of 10% to 20%, after which it increases once more, but more slowly than from Hvm to about 50%. It is positive at the distal end of the airfoil. In the variation relationship 52 drawn as a fine dashed line, the dihedral angle ν increases continuously from about 50% over a range of about 25% to 40%, while remaining negative; thereafter it decreases strongly over the last 10% to 25% of the height of the airfoil (going towards the distal end). In the variation relationship 53 drawn as a chain-dotted line, the dihedral angle ν increases a little from about 50%, over a range of 10% to 20%, and then decreases a little, being almost constant over the last 5% to 20% of the height of the airfoil (towards the distal end).

In FIG. 5, the values Hvm, ν(Hvm), and Hv1 are marked with reference to the curve representing the relationship 51 for variation in the dihedral angle ν.

As shown in FIG. 5, in the variation relationship 51, the dihedral angle ν is negative at the root of the airfoil where it may be substantially −15°. It decreases to a height Hvm that may be substantially 14%. Thereafter it increases up to a height of substantially 50%. Thereafter it increases but more slowly as a function of height. By way of example, in the variation relationship 51, the dihedral angle ν is negative over substantially the entire height of the airfoil. The dihedral angle ν may be positive over the last few percents of the height of the airfoil, at the tip of the airfoil, i.e. in the range 97% to 100%, for example.

In the variation relationship 52, the dihedral angle ν is negative at the root of the airfoil and may be substantially −8°. It decreases to a height Hvm, which may be substantially 22%. Thereafter it increases up to a height of substantially 80%. It then decreases once more as a function of height. For example, in the variation relationship 52, the dihedral angle ν is negative over the full height of the airfoil. Nevertheless, the dihedral angle ν in a variation relationship similar to the variation relationship 52 could be positive at its highest points; for example it could be positive around 80%.

In the variation relationship 53, the dihedral angle v is negative at the root of the airfoil and may be substantially −6°. It decreases to a height Hvm, which may be substantially 22%. Thereafter it increases up to a height of substantially 70%. It then decreases a little as a function of height. It is practically constant in the range 90% to 100%. For example, in the variation relationship 53, the dihedral angle v is negative over the full height of the airfoil.

In the variation relationship 54 drawn as a fine continuous line in FIG. 5, the dihedral angle v is positive at the root of the airfoil where it may be substantially +2°. It decreases up to a height Hvm, which may be substantially 32%. It then increases as a function of height, firstly strongly from Hvm to substantially 55%, and then more slowly from substantially 55% to 100%. For example, in the variation relationship 54, the dihedral angle v is positive at the root of the airfoil up to a height of about 8%. It may be negative in the range substantially 8% to substantially 50%. It may be positive once more in the range substantially 50% to 100%.

The person skilled in the art will understand that the characteristic shape of the invention relates above all to the proximal portion of the airfoil. A plurality of variations in the dihedral angle v in the distal portion of the airfoil are described above. Certain characteristics of certain curves may be combined with characteristics of other curves in order to create new relationships for variation in the dihedral angle.

Relationships for variation in the chord are described below with reference to FIGS. 6 and 7. In each of FIGS. 6 and 7, a dashed line shows an example of a conventional chord relationship, whereas an example of the proposed new relationship is drawn using a continuous line. The example shown of the conventional relationship for variation in C is an increasing relationship that is affine, or slightly concave from the proximal end of the airfoil to about halfway up the height of the airfoil.

The height H is expressed as a percentage of the total height of the airfoil. Beyond the ranges for which the curves of FIGS. 6 and 7 are drawn, the new variation relationships proposed for C join a conventional variation relationship, for example.

FIG. 6 shows a first example of a relationship for variation of the chord C as a function of height H for heights lying in the range 0% and a value HC2, the value HC2 lying in the range 40% to 70%. For example, in FIG. 6, the value HC2 may be substantially 50%. The function C is continuous and increasing. The function C is a convex function of the height H for heights H lying in the range of values HC1 to HC2, the value HC1 lying in the range 0% to 30%. By way of example, HC1 is 0% in FIG. 6. In this example, the proposed chord relationship C is less than the conventional chord relationship for heights lying in the range 0% to the value HC2. The straight line D5 connecting the point of abscissa value 0% (i.e. HC1) and ordinate value C(0) to the point of abscissa value HC21 and ordinate value C(HC21) has a slope lying in the range 1.20 to 11.40, the value HC21 being equal to HC1 plus 20%, i.e. HC21 is equal to 20% in this example.

The convex shape of the function C implies that in an initial stage for heights lying in the range 0% to the value HC21, the chord increases less than for the conventional variation relationship shown, whereas during a second stage, for heights lying in the range HC21 to HC2, the chord increases by more than the conventional variation relationship (drawn as a dashed line). This enables the proposed relationship to return to the conventional variation relationship, which it joins at a height close to the value HC2.

FIG. 7 shows a second example of a relationship for variation in the chord C as a function of height H, for heights lying in the range 0% to a value HC2, where the value HC2 lies in the range 40% to 70%. By way of example, in FIG. 7, the value HC2 may be substantially 50%. The function C is continuous and increasing. The function C is a convex function of height H for heights H lying in the range of values HC1 to HC2, the value HC1 lying in the range 0% to 30%. By way of example, in FIG. 7, the value HC1 may be about 16%. The proposed chord relationship C is slightly greater than the conventional relationship for heights lying in the range 0% to about 7%, and less than the conventional relationship for heights lying in the range about 7% to the value HC2. The straight line D5 connecting the point of abscissa value HC1 and ordinate value C(HC1) to the point of abscissa value HC21 and ordinate value C(HC21), where the value HC21 is 36% (i.e. HC1 plus 20%), presents a slope lying in the range 1.20 to 11.40.

The proposed relationship substantially follows the conventional affine relationship (drawn as a dashed line) for heights lying in the range 0% to 7% approximately. It is concave in the range 0% to HC1. The point of abscissa value HC1 and ordinate value C(HC1) is a point of inflection in the curve representing the proposed relationship.

Furthermore, since the function C is convex for values of H lying in the range HC1 to HC2, the line D5 connecting the point of abscissa value HC1 and ordinate value C(HC1) to the point of abscissa value HC21 and ordinate value C(HC21) has a slope that is less than that of the line connecting the point of abscissa value HC21 and ordinate value C(HC21) to the point of abscissa value HC2 and ordinate value C(HC2). In a first stage, for heights lying in the range HC1 to the value HC21, the chord C increases less than for the conventional relationship shown, whereas in a second stage, for heights lying in the range HC21 to HC2, the chord increases more than for the conventional relationship. This enables the proposed relationship to return towards the known relationship, which it joins at a height H close to the value HC2.

For reasons of concision, certain well-known aspects in designing and making a turbine engine blade are not described in the present description, and persons skilled in the art can rely on their knowledge of these aspects for making a blade of the invention.

In particular, as explained above, the shape of an airfoil is defined not only by the shape of the stacking line of the airfoil sections, but also by the shapes of those airfoil sections along the airfoil, and by the twists applied to those airfoil sections as a function of height. Starting from a certain stacking line, persons skilled in the art are themselves capable of selecting airfoil sections of shape and twist appropriate to the intended application.

The embodiments or implementations described in the present description are given by way of non-limiting illustration, and in the light of this description persons skilled in the art can easily modify these embodiments or implementations, or can envisage others, while remaining within the scope of the invention.

Furthermore, the various characteristics of these embodiments or implementations can be used singly or in combination with one another. When they are combined, the characteristics may be combined as described above or in other ways, the invention not being limited to the specific combinations described in the present description. In particular, unless specified to the contrary, a characteristic that is described with reference to any one embodiment or implementation may be applied in analogous manner to some other embodiment or implementation.

The invention claimed is:

1. A turbine engine rotor blade comprising:
an airfoil defined by plane airfoil sections stacked in a radial direction, each airfoil section being positioned radially at a height H, where height H is expressed as a percentage of a total height of the airfoil, and being located by a sweep angle λ thereof at a leading edge and a dihedral angle ν thereof at the leading edge,
wherein the sweep angle λ varies as a function of height H in such a manner that:
the sweep angle λ reaches a maximum at a height HλM, the value HλM lying in the range 5% to 40%; and
the sweep angle λ increases from 0% to HλM,
wherein the dihedral angle ν varies as a function of H in such a manner that the dihedral angle ν is a decreasing function of height H for heights H lying in the range 0% to a value Hν1, the value Hν1 lying in the range 10% to 40%, and
wherein the sweep angle increases by at least 14° from 0% to HλM.

2. The rotor blade according to claim 1, wherein each airfoil section has a chord C defined in the airfoil section plane, variation in the chord C as a function of height H being such that:
the chord C is a continuous and increasing function of height H;
the chord C is a convex function of height H for heights H in the range of values HC1 to HC2, the value HC1 lying in the range 0% to 30%, and the value HC2 lying in the range 40% to 70%; and
the straight line connecting the point of abscissa value HC1 and ordinate value C(HC1) to the point of abscissa value HC2 and ordinate value C(HC2) has a slope lying in the range 0.85 to 3.70.

3. The rotor blade according to claim 2, wherein the straight line connecting the point of abscissa value HC1 and ordinate value C(HC1) to the point of abscissa value HC21 and ordinate value C(HC21) has a slope lying in the range 1.20 to 11.40, the abscissa value HC21 being equal to the abscissa value HC1 plus 20%.

4. The rotor blade according to claim 1, wherein the variation in sweep angle λ as a function of H is such that the sweep angle λ is positive for heights H lying in the range of values Hλ1 to Hλ2, the values Hλ1 and Hλ2 lying in the range 0% to 50%, and the sweep angle λ is negative in at least one of the range 0% to Hλ1 and the range Hλ2 to 100%.

5. The rotor blade according to claim 1, wherein the value of the dihedral angle ν varies as a function of H in such a manner that the dihedral angle ν increases for heights in the range Hν1 to Hν1+20%.

6. The rotor blade according to claim 1, wherein the dihedral angle ν varies as a function of H in such a manner that the dihedral angle ν reaches a minimum that is negative for a height Hνm, the value Hνm lying in the range 10% to 40%.

7. A turbine engine compressor having a plurality of blades according to claim 1.

8. A turbine engine having a plurality of blades according to claim 1.

9. The rotor blade according to claim 1, wherein the sweep angle is a minimum value at 100%.

10. A turbine engine rotor blade comprising:
an airfoil defined by plane airfoil sections stacked in a radial direction, each airfoil section being positioned radially at a height H, where height H is expressed as a percentage of a total height of the airfoil, and being located by a sweep angle λ thereof at a leading edge and a dihedral angle ν thereof at the leading edge,
wherein the sweep angle λ varies as a function of height H in such a manner that:
the sweep angle λ reaches a maximum at a height HλM, the value HλM lying in the range 5% to 40%; and
the sweep angle λ increases from 0% to HλM,
wherein the dihedral angle ν varies as a function of H in such a manner that the dihedral angle ν is a decreasing function of height H for heights H lying in the range 0% to a value Hν1, the value Hν1 lying in the range 10% to 40%, and
wherein each airfoil section has a chord C defined in the airfoil section plane, variation in the chord C as a function of height H being such that:
the chord C is a continuous and increasing function of height H;
the chord C is a convex function of height H for heights H in the range of values HC1 to HC2, the value HC1 lying in the range 0% to 30%, and the value HC2 lying in the range 40% to 70%; and
the straight line connecting the point of abscissa value HC1 and ordinate value C(HC1) to the point of abscissa value HC2 and ordinate value C(HC2) has a slope lying in the range 0.85 to 3.70.

11. The rotor blade according to claim 10, wherein the straight line connecting the point of abscissa value HC1 and ordinate value C(HC1) to the point of abscissa value HC21 and ordinate value C(HC21) has a slope lying in the range 1.20 to 11.40, the abscissa value HC21 being equal to the abscissa value HC1 plus 20%.

12. The rotor blade according to claim 10, wherein the variation in sweep angle λ as a function of H is such that the sweep angle λ is positive for heights H lying in the range of values Hλ1 to Hλ2, the values Hλ1 and Hλ2 lying in the range 0% to 50%, and the sweep angle λ is negative in at least one of the range 0% to Hλ1 and the range Hλ2 to 100%.

13. The rotor blade according to claim 10, wherein the value of the dihedral angle ν varies as a function of H in such a manner that the dihedral angle ν increases for heights in the range Hν1 to Hν1+20%.

14. The rotor blade according to claim 10, wherein the dihedral angle ν varies as a function of H in such a manner that the dihedral angle ν reaches a minimum that is negative for a height Hνm, the value Hνm lying in the range 10% to 40%.

15. A turbine engine compressor having a plurality of blades according to claim 10.

16. A turbine engine having a plurality of blades according to claim 10.

17. The rotor blade according to claim 10, wherein the sweep angle is a minimum value at 100%.

* * * * *

UNITED STATES PATENT AND TRADEMARK OFFICE
CERTIFICATE OF CORRECTION

Page 1 of 1

PATENT NO. : 10,301,941 B2
APPLICATION NO. : 14/910586
DATED : May 28, 2019
INVENTOR(S) : Damien Joseph Cellier et al.

It is certified that error appears in the above-identified patent and that said Letters Patent is hereby corrected as shown below:

On the Title Page

Item (71) Applicant, change "SNECMA" to --SAFRAN AIRCRAFT ENGINES--; and

Item (73) Assignee, change "SAFRAN AIRCARFT ENGINES" to --SAFRAN AIRCRAFT ENGINES--.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*